(12) United States Patent
Kouvo et al.

(10) Patent No.: US 11,305,656 B2
(45) Date of Patent: Apr. 19, 2022

(54) SYSTEM AND METHOD FOR SUPPLYING ELECTRIC ENERGY TO A MINING VEHICLE AND A MINING VEHICLE

(71) Applicant: SANDVIK MINING AND CONSTRUCTION OY, Tampere (FI)

(72) Inventors: Mikko Kouvo, Vallingby (SE); Raimo Juntunen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 17/057,387

(22) PCT Filed: May 16, 2019

(86) PCT No.: PCT/EP2019/062640
§ 371 (c)(1),
(2) Date: Nov. 20, 2020

(87) PCT Pub. No.: WO2019/224102
PCT Pub. Date: Nov. 28, 2019

(65) Prior Publication Data
US 2021/0197679 A1    Jul. 1, 2021

(30) Foreign Application Priority Data

May 23, 2018 (EP) ..................................... 18173724

(51) Int. Cl.
*B60L 53/14* (2019.01)
*B60L 53/20* (2019.01)
(Continued)

(52) U.S. Cl.
CPC ............... *B60L 53/14* (2019.02); *B60L 50/60* (2019.02); *B60L 53/20* (2019.02); *B60L 58/22* (2019.02);
(Continued)

(58) Field of Classification Search
CPC .......... B60L 53/14; B60L 50/60; B60L 53/20; B60L 58/22; B60L 2200/40; B60L 50/53; B60L 58/19; B60L 53/10; B60L 53/53; B60L 58/10; H02J 7/0024; H02J 2310/48; H02J 1/08; H02J 1/04; H02J 7/0063; H02J 7/007; H02J 7/34; H02J 1/106;
(Continued)

(56) References Cited

U.S. PATENT DOCUMENTS 10,778,025 B2 *  9/2020  Gazit ..................... H02J 7/0013
2007/0139012 A1  6/2007  Hayashigawa
(Continued)

FOREIGN PATENT DOCUMENTS

WO       2011080392 A1    7/2011

*Primary Examiner* — Lincoln D Donovan
*Assistant Examiner* — Alex W Lam
(74) *Attorney, Agent, or Firm* — Corinne R. Gorski

(57) ABSTRACT

A system and method for supplying electric energy to a mining vehicle and a mining vehicle are provided. Electric energy is supplied to the mining vehicle using a system including a bipolar LVDC supply having a certain total voltage. The mining vehicle has at least a first energy unit and a second energy unit. The first energy unit is connected to a part of the certain total voltage and the second energy unit is connected to another part of the certain total voltage.

10 Claims, 4 Drawing Sheets

(51) Int. Cl.
 *B60L 50/60* (2019.01)
 *B60L 58/22* (2019.01)
 *H02J 7/00* (2006.01)

(52) U.S. Cl.
 CPC ......... *H02J 7/0024* (2013.01); *B60L 2200/40* (2013.01); *H02J 2310/48* (2020.01)

(58) Field of Classification Search
 CPC .... H02J 1/084; H02J 1/10; H02J 1/102; H02J 1/14; H02J 3/10; H02J 3/28; H02J 3/32; H02J 7/0003; H02J 7/0032; H02J 7/0025; H02J 7/00714; H02J 7/02; H02J 7/022; H02J 2207/00; H02J 2207/30; H02J 7/0026; H02J 7/0034; Y02T 10/70; Y02T 10/7072; Y02T 90/14; H02M 3/04; H02M 3/33584; H02M 1/32; H02H 7/268; H02H 3/087; Y02E 60/10; H01M 50/59
 See application file for complete search history.

(56) References Cited

U.S. PATENT DOCUMENTS

| | | | |
|---|---|---|---|
| 2009/0079384 A1* | 3/2009 | Harris | H02J 7/0024 320/102 |
| 2012/0049771 A1* | 3/2012 | Komatsu | B60L 1/003 318/139 |
| 2013/0020982 A1 | 1/2013 | Mercier et al. | |
| 2019/0047433 A1* | 2/2019 | Rozman | B60L 53/65 |
| 2019/0312441 A1* | 10/2019 | Ballantine | G06F 1/263 |

* cited by examiner

SYSTEM AND METHOD FOR SUPPLYING ELECTRIC ENERGY TO A MINING VEHICLE AND A MINING VEHICLE

RELATED APPLICATION DATA

This application is a § 371 National Stage Application of PCT International Application No. PCT/EP2019/062640 filed May 16, 2019 claiming priority to EP 18173724.8 filed May 23, 2018.

FIELD OF THE INVENTION

The invention relates to a system and method for supplying electric energy to a mining vehicle and a mining vehicle.

BACKGROUND OF THE INVENTION

Underground mining vehicles require high power during their use. If electric energy is used for supplying the mining vehicles, the voltage level of the components should not be very high because high voltage level requires large to clearances and insulations, for example. This leads to large, complicated, and expensive components. Typically, the mining vehicles should, however, be as compact as possible. On the other hand, lower voltage level causes that the currents in the system rise. High current requires thick conductors, for example, in the supply system and in the mining vehicle thereby raising the costs.

BRIEF DESCRIPTION [DISCLOSURE] OF THE INVENTION

An object of the invention is to provide a new system, method and a mining vehicle.

In the presented solution electric energy is supplied to a mining vehicle using a system comprising a bipolar LVDC supply having a certain total voltage. The mining vehicle comprises at least a first energy unit and a second energy unit. The first energy unit is connected to a part of said certain total voltage and the second energy unit is connected to another part of said certain total voltage. Thereby the components of the first and second energy unit need to tolerate a voltage level that is only a part of the total voltage. However, bipolar LVDC supply supplies power on the total voltage to the mining vehicle whereby the supplied power may be high although the current is moderate.

According to an embodiment, the bipolar LVDC supply comprises a positive pole and a negative pole and a neutral point between the positive pole and the negative pole. The first energy unit may be connected between the positive pole and the neutral point and the second energy unit may be connected between the negative pole and the neutral point. Thereby the voltage balance is reliable in the mining vehicle.

According to another embodiment, the bipolar LVDC supply comprises a first converter and a second converter connected in series. The converters may be used for keeping the voltage balanced in both halves of the mining vehicle. It is possible to arrange the neutral point between the first and second converters.

According to another embodiment, the first energy unit and the second energy unit comprise traction motors of the mining vehicle.

According to another embodiment, the first energy unit and the second energy unit comprise batteries and the mining vehicle comprises connecting means and a control unit. The control unit may be arranged to connect the batteries in parallel in drive mode and arranged to connect the batteries in series in charge mode. In drive mode the connect in parallel means that the voltage level required for the vehicle DC-bus and the components in the vehicle is rather low. In charge mode a higher charging voltage is supplied. This allows for a use of a simple and cheap plug-socket connection and smaller and lighter cables for high power fast charging.

BRIEF DESCRIPTION OF THE DRAWINGS

In the following the invention will be described in greater detail by means of embodiments with reference to the attached drawings, in which.

DETAILED DESCRIPTION OF THE INVENTION

Figure 1:
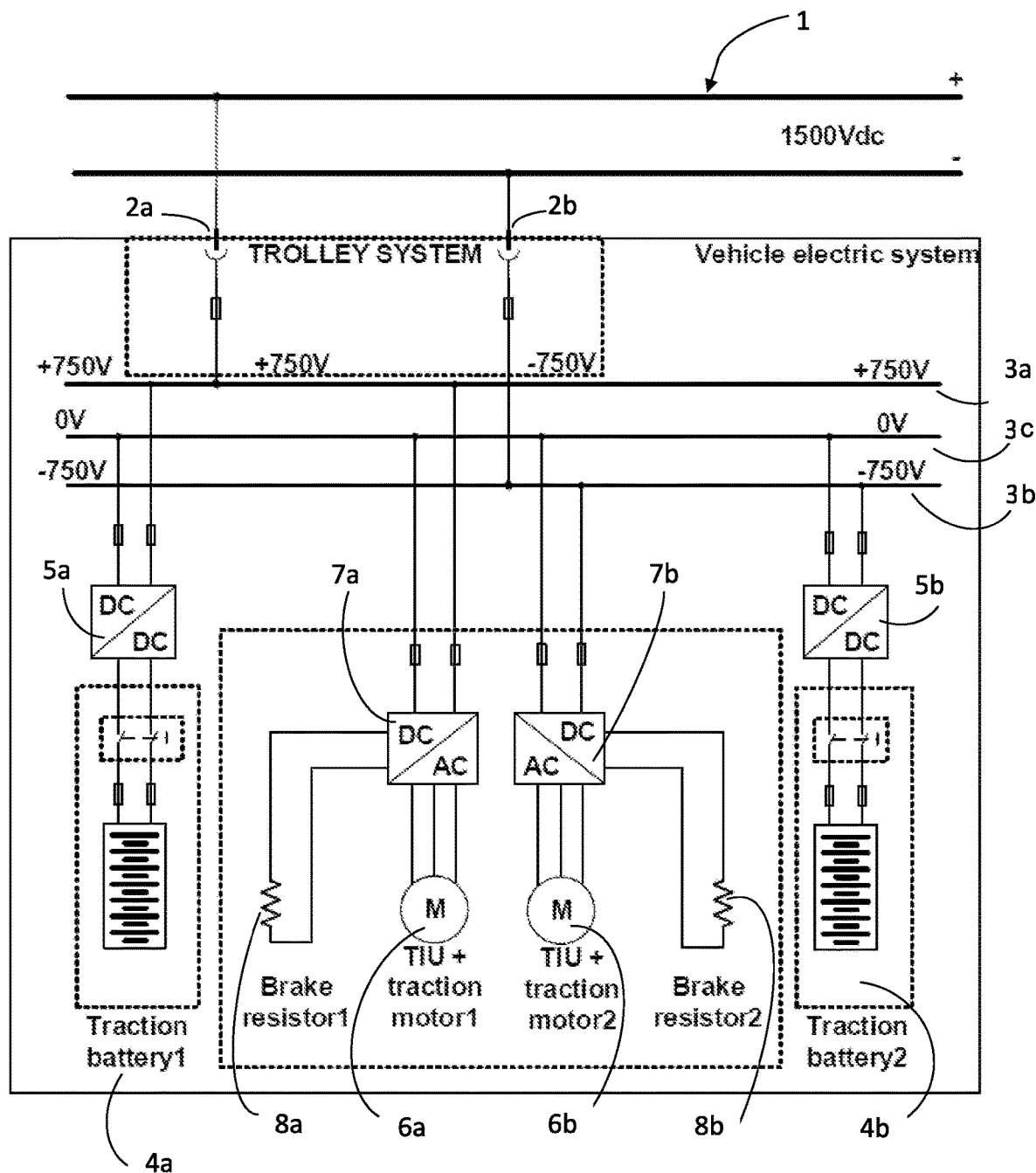
FIG. 1 is a schematic of an electric system of a mining vehicle.

FIG. 1 shows a schematic of an electric system of a mining vehicle. The mining vehicle may be a dump truck, a LHD (load-haul-dump vehicle), an underground mining truck or a drill rig, for example.

Reference numeral 1 depicts a bipolar LVDC (low voltage direct current) supply. In the embodiment shown in FIG. 1 the total voltage of the bipolar LVDC supply is 1500 V. However, the total voltage may be lower or higher than that, such as 400 V, 800 V, 1000 V or 5 kV. However, a voltage level of 1500 V or less is advantageous because such voltage level is still considered as low voltage according to the IEC rules and the European Union directive 2014/35/EU i.e. low voltage directive, for example. Higher voltage would result in requirements with larger clearances etc. leading to larger, complicated and expensive components.

The mining vehicle comprises connectors 2a and 2b for connecting the mining vehicle to the bipolar LVDC supply 1. The connectors 2a and 2b may be trolley connections connecting the mining vehicle to a trolley line, for example. Further, the connectors 2a and 2b may be a charging connector/coupler of a charging device, for example. The connectors 2a and 2b may be separate connectors or connected to the same charging connector/coupler.

Reference numerals 3a, 3b and 3c depict the DC bus of the mining vehicle. 3a is the positive pole bus bar, 3b is the negative pole bus bar and 3c is the neutral or 0V bus bar. The total voltage of the bipolar LVDC supply is divided in to two halves that are substantially equal. Thus, if the total voltage of the bipolar LVDC supply is 1500 V, for example, in the mining vehicle the total voltage is separated to two halves to comprise +750 V, 0 V and −750 V levels.

The mining vehicle comprises a first traction battery 4a and a second traction battery 4b. The traction batteries 4a and 4b may be used as a power source when the mining vehicle is used without a contact to the outside power supply, thus, outside of a trolley line, for example.

For connecting the traction batteries 4a, 4b to the DC bus of the mining vehicle, DC/DC converters 5a, 5b may be used. The first traction battery 4a is connected to a first part of the total voltage and the second traction battery 4b is connected to another part of the total voltage.

The DC/DC converters 5a, 5b are not necessary for connecting the traction batteries 4a, 4b to the DC bus of the mining vehicle. This is the case when an external charger is used providing that the charger itself controls its voltage, for example.

The mining vehicle further comprises a first traction motor 6a and a second traction motor 6b. The mining vehicle may comprise two separate traction motor drives, that is one traction motor drive per axle. The two traction motor drives may also be connected together into a summation gear.

The first traction motor 6a is connected to the first part of the total voltage and the second traction motor 6b is connected to the another part of the total voltage. The traction motors 6a and 6b are connected to the DC bus of the mining vehicle with inverters 7a and 7b.

According to an embodiment, the mining vehicle may comprise a plurality of wheel hub motors, that is a plurality of traction motors. Each wheel may comprise a wheel hub motor. In such case, a four-wheel mining vehicle comprises four wheel hub motors or traction motors, for example. If the mining vehicle comprises more than four wheels, the mining vehicle may also comprise more than four wheel hub motors. The mining vehicle may also comprise odd number of wheel hub motors. In the mining vehicle the first energy unit connected to a part of said certain total voltage of the bipolar LVDC supply may comprise one or more traction motors such as wheel hub motors and the second energy unit connected to another part of said certain total voltage of the bipolar LVDC supply may comprise one or more traction motors such as wheel hub motors.

The mining vehicle further comprises a first brake resistor 8a and a second brake resistor 8b. The brake resistors 8a and 8b may be connected to the DC side of the inverters 7a and 7b.

It is advantageous to keep the voltage balanced in both halves. When the mining vehicle is disconnected from the LVDC supply and energy is supplied from the batteries, it is possible that the traction motors 6a and 6b experience different loads at the same time, which can cause voltage imbalance in the DC bus. This voltage imbalance may be prevented or decreased with the DC/DC converters 5a and 5b connected to each DC bus halves and charging or discharging the batteries 4a and 4b.

Additionally, the brake resistors 8a and 8b may be switched to each DC bus halves to maintain the voltage symmetry. The brake resistors 8a and 8b may be used for maintaining the voltage symmetry during downhill drive, especially.

Figure 2:
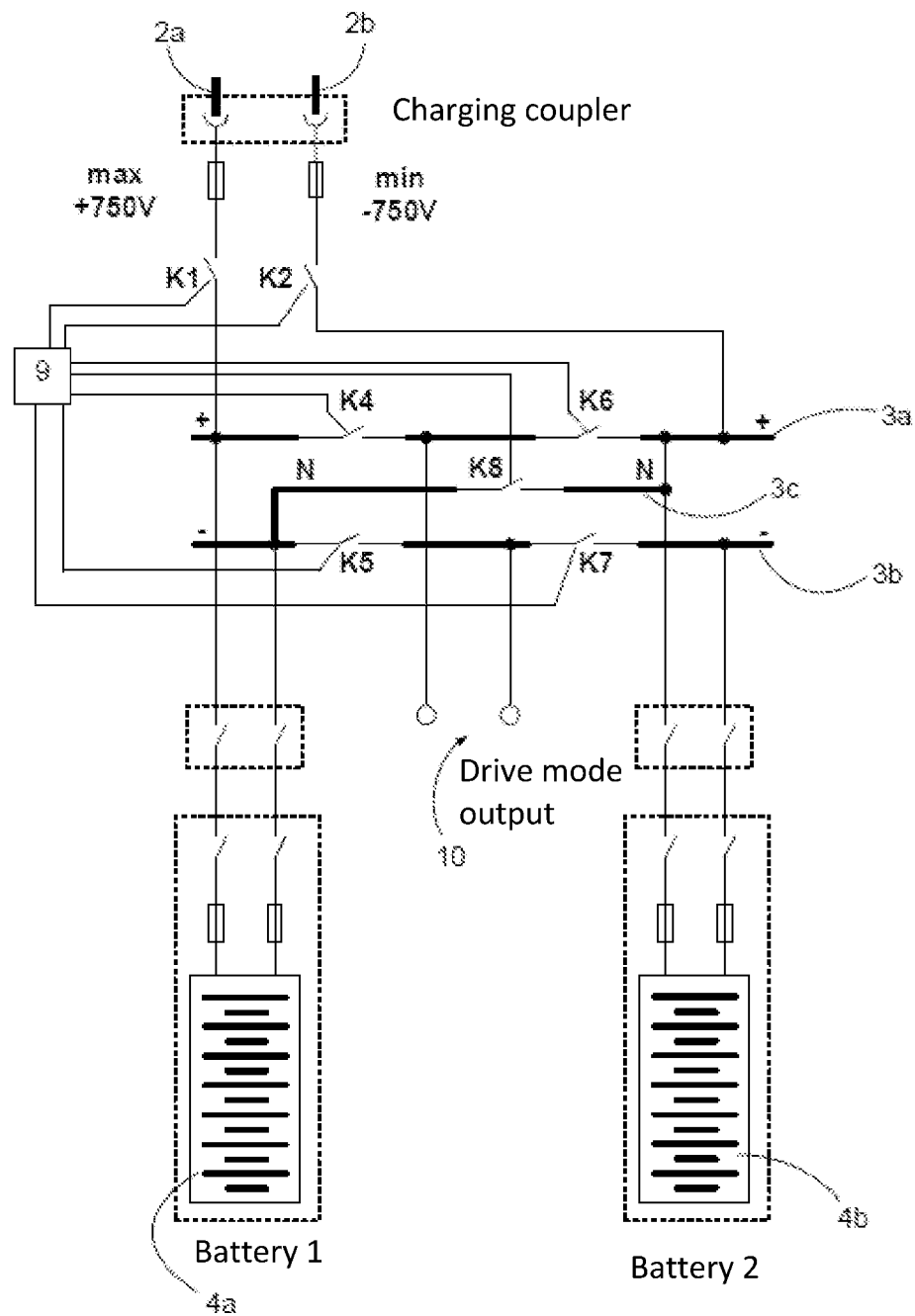
FIG. 2 is a schematic showing how to connect the batteries of the mining vehicle.

FIG. 2 shows a schematic how to connect the batteries of the mining vehicle. The electric system of the mining vehicle may comprise two or more even numbered amount of batteries. In drive mode of the mining vehicle, the batteries are connected in parallel. In charge mode of the mining vehicle, the batteries are connected in series.

The contactors K1, K2, K4, K5, K6, K7 and K8 are connecting means that are used for providing the connecting in parallel and the connecting in series. Contactor K1 is a positive pole charging contactor and contactor K2 is a negative pole charging contactor. Contactors K4 and K6 are used for positive pole disconnection for charging busbars. Contactors K5 and K7 are used for negative pole disconnection for charging busbars. Contactor K8 is a neutral pole connection device for charging busbars.

The control unit 9 controls the contactors. The battery energy for use is taken from the drive mode output 9 depicted in the FIG. 2.

Referring to the FIG. 2, while batteries are parallel-connected, the charging contactors K1, and K2 are open (not contacting), contactors K4, K5, K6, and K7 are closed (contacting), and K8 is open (not contacting).

To ready the batteries for bipolar charging, contactors K4, K5, K6, and K7 are opened (break contact), after which the contactor K8 is closed (make contact). When charging is started, the contactors K1 and K2 are closed (make contact).

It should be noted that the bipolar charging of the batteries does not necessarily require a neutral point connection from the charging system because to the batteries are normally parallel-connected and share the same SOC and voltage. The neutral point N is at 0V inherently.

Figure 3:
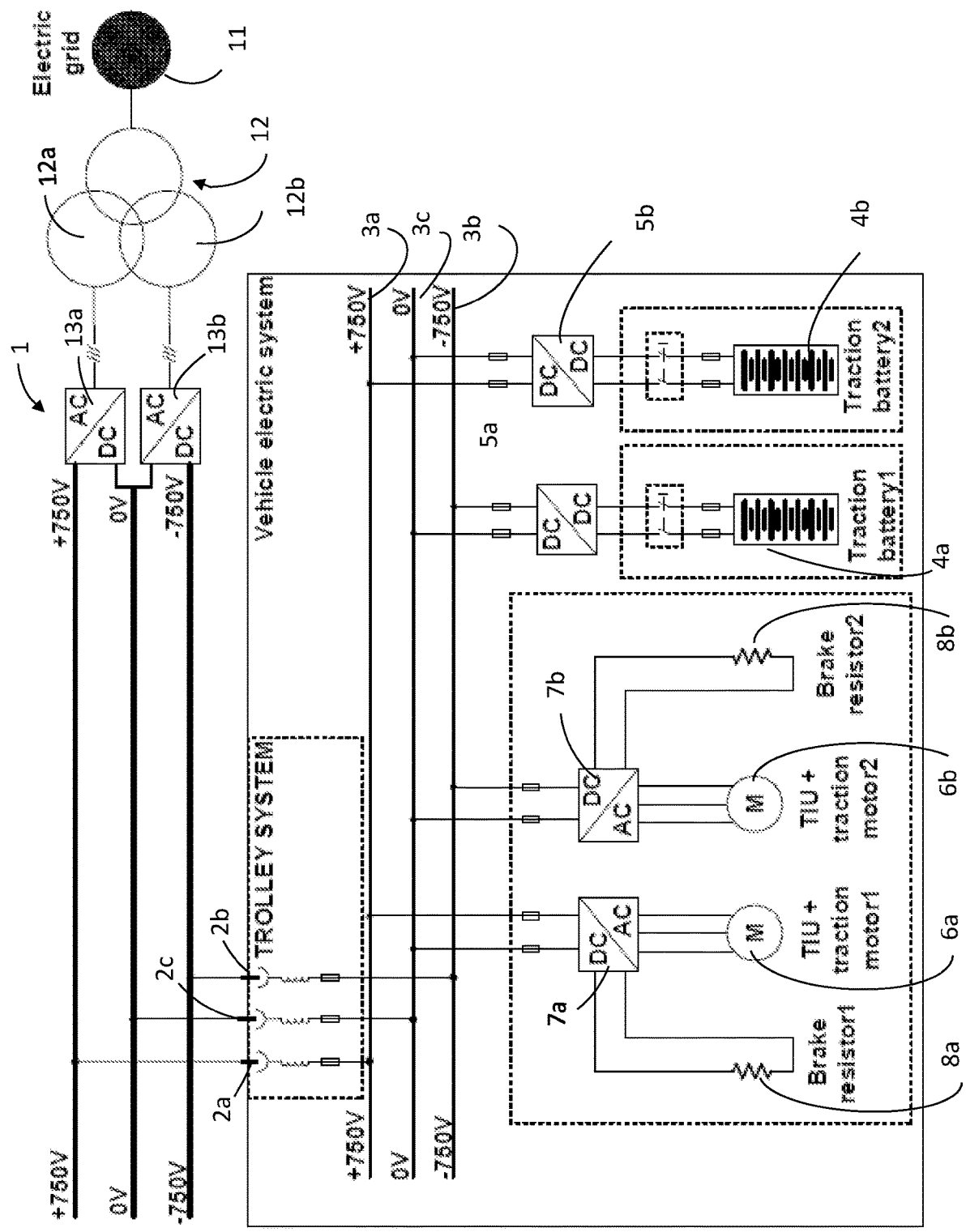
FIG. 3 is a schematic of another electric system of a mining vehicle.

FIG. 3 shows a solution similar to shown in FIG. 1 but with an improvement relating to voltage balance. In addition to the positive pole connector 2a and the negative pole connector 2b, the mining vehicle comprises a neutral point connector 2c. The neutral point connector 2c connects the centreline or 0 V or neutral point of the bipolar LVDC supply 1 to the mining vehicle.

The improved voltage balance using the neutral point in the LVDC supply is advantageous especially if the mining vehicle comprises odd number of traction motors, for example. Further balancing may be performed using the brake resistors 8a, 8b and/or DC/DC converters 5a, 5b.

The bipolar LVDC supply 1 is supplied from an electric grid 11. The bipolar LVDC supply 1 may comprise a transformer 12. In FIG. 3 the transformer 12 comprises two secondaries 12a, 12b. According to an embodiment the number of secondaries of the transformer 12 is one. According to another embodiment the number of the secondaries of the transformer 12 is more than two.

The bipolar LVDC supply 1 further comprises a first converter 13a and a second converter 13b. The first converter 13a and the second converter 13b are connected in series whereby the neutral point is arranged between the first and second converters. Thereby the centerline of the mining vehicle is effectively balanced and thus the voltage balance is maintained on a high level.

Instead of the converters in series, as shown in FIG. 3, the bipolar LVDC supply with the neutral point may also be provided using one converter. In such case the converter may be a three level NPC (Neutral-Point-Clamped) inverter, for example.

Figure 4:
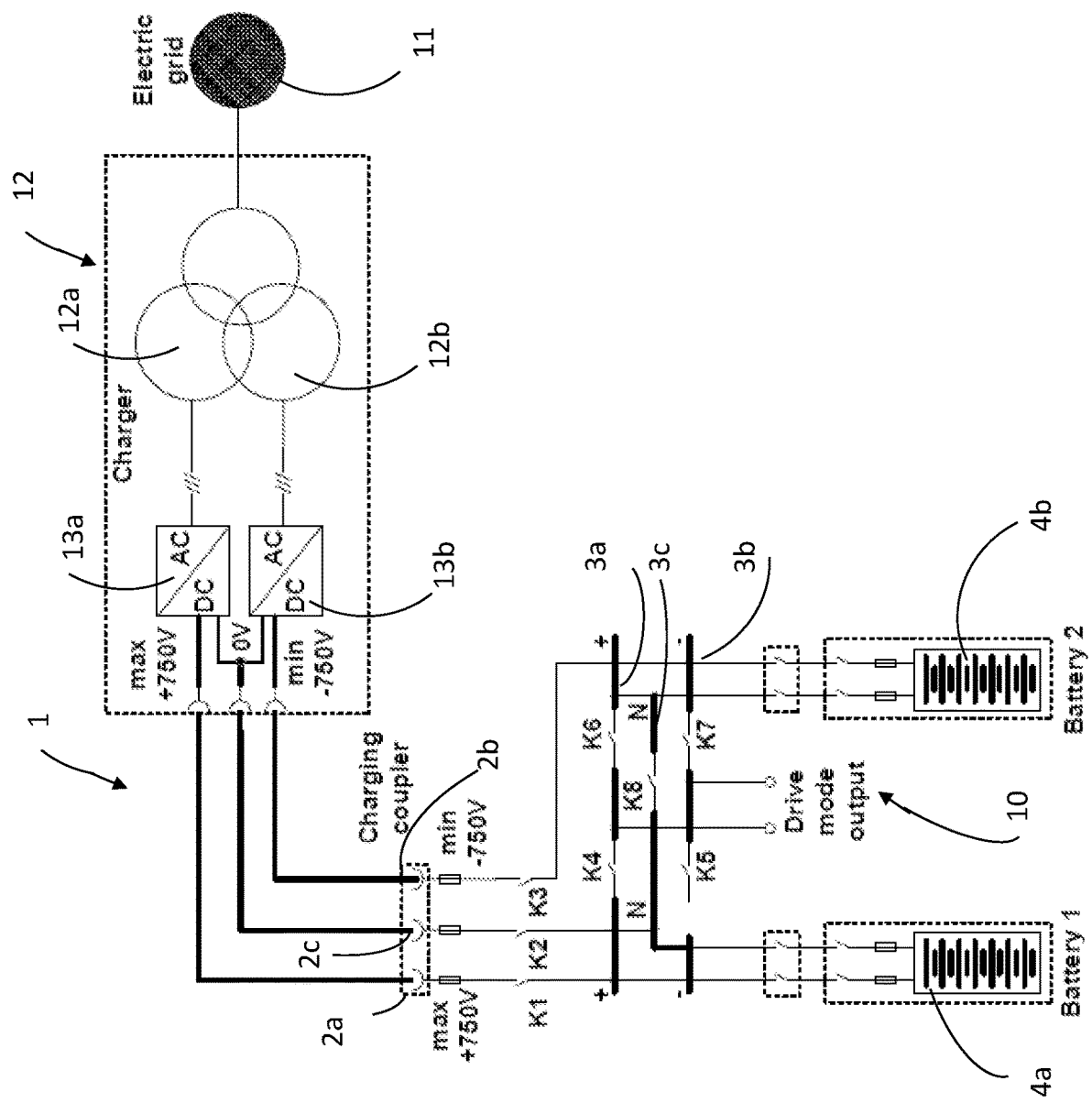
FIG. 4 is a schematic of another embodiment how to connect the batteries of the mining vehicle.

FIG. 4 shows a solution where the improvement relating to voltage balance is implemented in a manner similar to the solution in FIG. 3. In addition to the positive pole charging contactor K1 and the negative pole charging contactor K2 the mining vehicle comprises a neutral pole charging contactor K3.

In the solution shown in FIG. 2 different voltage levels in the batteries 4a and 4b would cause that the point between the batteries would not be neutral (0 V). However, the solution shown in FIG. 4 provides for the voltage balance and thereby protects the charger itself, for example.

According to an embodiment the mining vehicle may comprise a three level NPC inverter or any other multi level inverter for driving a motor having a higher voltage level. Such a motor may be connected between the positive pole to and the negative pole and possibly to the neutral pole, also.

Thus, an energy unit may be connected between the positive pole and the negative pole with neutral connection using a three level NPC inverter, for example. If such an energy unit is bipolar as such and comprises a neutral point or it comprises components connected in series over which the voltage divides naturally, the components of the energy unit need to tolerate a lower voltage, only. Thus, the energy unit connected to a part of said certain total voltage may comprise a traction motor and/or a battery and/or any other electrical component.

It will be obvious to a person skilled in the art that, as technology advances, the inventive concept can be implemented in various ways. The invention and its embodiments are not limited to the examples described above but may vary within the scope of the claims.

The invention claimed is:

1. A system for supplying electric energy to a mining vehicle, the system comprising:
   a bipolar LVDC supply having a certain total voltage and comprising a positive pole and a negative pole and a neutral point between the positive pole and the negative pole, wherein the total voltage is divided into two equal halves that are substantially equal; and
   the mining vehicle, the mining vehicle including at least a first energy unit and a second energy unit, the first energy unit being connected between the positive pole and the neutral point and the second energy unit being connected between the negative pole and the neutral point, wherein the bipolar LVDC supply includes a first converter and a second converter connected in series whereby the neutral point is arranged between the first and second converters to keep the total voltage balanced between the two equal halves.

2. The system as claimed in claim 1, wherein the first energy unit and the second energy unit include traction motors of the mining vehicle.

3. The system as claimed in claim 1, wherein the first energy unit and the second energy unit include batteries, the mining vehicle including connecting means and a control unit, the control unit being arranged to connect the batteries in parallel in drive mode and arranged to connect the batteries in series in a charge mode.

4. A method of supplying electric energy to a mining vehicle, comprising:
   providing a mining vehicle, the mining vehicle including at least a first energy unit and a second energy unit;
   supplying electric energy to the mining vehicle from a bipolar LVDC supply having a certain total voltage, the bipolar LVDC supply including a positive pole and a negative pole and a neutral point between the positive pole and the negative pole, wherein the total voltage is divided into two halves that are substantially equal;
   connecting the first energy unit to a part of said certain total voltage and connecting the second energy unit to another part of said certain total voltage, wherein the first energy unit is connected between the positive pole and the neutral point and the second energy unit is connected between the negative pole and the neutral point, wherein the bipolar LVDC supply is formed by connecting a first converter and a second converter in series and arranging the neutral point between the first and second converters.

5. The method as claimed in claim 4, wherein the first energy unit and the second energy unit include traction motors of the mining vehicle.

6. The method as claimed in claim 4, wherein the first energy unit and the second energy unit have batteries and the batteries are connected in parallel in a drive mode and the batteries are connected in series in a charge mode.

7. A mining vehicle, comprising:
   at least a first energy unit;
   a second energy unit; and
   connecting means for connecting the first and second energy units to a bipolar LVDC supply having a certain total voltage, the bipolar LVDC supply including a positive pole and a negative pole and a neutral point between the positive pole and the negative pole, wherein the total voltage is divided into two halves that are substantially equal, wherein the first energy unit is connected to one half of the certain total voltage and the second energy unit is connected to another half of the certain total voltage, wherein the bipolar LVDC supply includes a first converter and a second converter connected in series, whereby the neutral point is arranged between the first and second converters to keep the total voltage balanced between the two equal halves.

8. The mining vehicle as claimed in claim 7, wherein the connecting means includes a positive pole connector, a neutral point connector and a negative pole connector arranged for connecting the first energy unit between the positive pole and the neutral point and the second energy unit between the negative pole and the neutral point.

9. The mining vehicle as claimed in claim 7, wherein the first energy unit and the second energy unit include traction motors of the mining vehicle.

10. The mining vehicle as claimed in claim 7, wherein the first energy unit and the second energy unit include batteries, the mining vehicle further comprising a control unit, the control unit being arranged to connect the batteries in parallel in a drive mode and arranged to connect the batteries in series in a charge mode.

* * * * *